(12) United States Patent
Schraer

(10) Patent No.: US 9,091,287 B2
(45) Date of Patent: Jul. 28, 2015

(54) WASHER, SCREW OR NUT WITH INCREASED COEFFICIENT OF FRICTION

(75) Inventor: Thorsten Schraer, Jetzendorf (DE)

(73) Assignee: RUIA GLOBAL FASTENERS AG (DE)

( * ) Notice: Subject to any disclaimer, the term of this patent is extended or adjusted under 35 U.S.C. 154(b) by 565 days.

(21) Appl. No.: 13/060,559

(22) PCT Filed: Aug. 24, 2009

(86) PCT No.: PCT/DE2009/050046
§ 371 (c)(1),
(2), (4) Date: Mar. 17, 2011

(87) PCT Pub. No.: WO2010/022720
PCT Pub. Date: Mar. 4, 2010

(65) Prior Publication Data
US 2011/0158768 A1    Jun. 30, 2011

(30) Foreign Application Priority Data
Aug. 26, 2008    (DE) .............. 20 2008 011 371 U

(51) Int. Cl.
*F16B 2/00* (2006.01)
*F16B 39/282* (2006.01)
*F16B 43/00* (2006.01)

(52) U.S. Cl.
CPC .............. *F16B 2/005* (2013.01); *F16B 39/282* (2013.01); *F16B 43/00* (2013.01)

(58) Field of Classification Search
CPC ......... F16B 2/005; F16B 39/282; F16B 43/00

USPC .......... 411/161, 162, 369, 531, 533, 542, 960
See application file for complete search history.

(56) References Cited

U.S. PATENT DOCUMENTS

| | | | | |
|---|---|---|---|---|
| 1,963,535 A | * | 6/1934 | Trotter | 411/156 |
| 3,030,997 A | * | 4/1962 | Collins | 411/301 |
| 3,168,321 A | * | 2/1965 | Glicksman | 277/637 |
| 3,241,422 A | * | 3/1966 | Heimovics | 411/371.1 |
| 3,332,464 A | * | 7/1967 | Castel | 411/155 |
| 3,399,589 A | | 9/1968 | Breed | |

(Continued)

FOREIGN PATENT DOCUMENTS

| | | |
|---|---|---|
| DE | 33 29 967 A1 * | 11/1984 |
| DE | 34 11 812 A1 * | 7/1985 |

(Continued)

OTHER PUBLICATIONS

English translation of the International Preliminary Report on Patentability which issued in connection with International Application No. PCT/DE2009/050046.

(Continued)

*Primary Examiner* — Gay Ann Spahn
(74) *Attorney, Agent, or Firm* — Clark Hill PLC

(57) ABSTRACT

The invention relates to a washer (10), screw or nut having an end surface (12) which faces toward a workpiece, wherein the end surface (12) is provided with a concentric, annularly encircling web (14), and that region (18) of the end surface (12) which is situated outside the encircling web (14) tapers conically toward the web (14) from the outside, with the inclination from the outside to the inside being directed away from the workpiece.

4 Claims, 1 Drawing Sheet

(56) References Cited

U.S. PATENT DOCUMENTS

| | | | |
|---|---|---|---|
| 3,476,009 A * | 11/1969 | Markey | 411/11 |
| 3,531,850 A * | 10/1970 | Durand | 411/160 |
| 3,606,357 A * | 9/1971 | Yonkers | 411/537 |
| 3,618,444 A * | 11/1971 | Kay | 411/373 |
| 3,628,584 A * | 12/1971 | Gutshall | 411/155 |
| 3,659,491 A * | 5/1972 | Duffy et al. | 411/436 |
| 3,678,979 A * | 7/1972 | Bjorklumd | 411/134 |
| 3,680,619 A * | 8/1972 | Sparks | 411/134 |
| 3,744,012 A * | 7/1973 | Gutshall | 439/782 |
| 3,750,525 A * | 8/1973 | Waters et al. | 411/34 |
| 3,856,066 A * | 12/1974 | Reynolds | 411/155 |
| 3,882,752 A * | 5/1975 | Gutshall | 411/371.1 |
| 4,103,725 A * | 8/1978 | Abe | 411/160 |
| 4,292,876 A * | 10/1981 | De Graan | 411/542 |
| 4,467,581 A * | 8/1984 | Francovitch | 52/410 |
| 4,476,660 A * | 10/1984 | Francovitch | 52/515 |
| 4,482,278 A * | 11/1984 | Dorn | 411/377 |
| 4,686,808 A * | 8/1987 | Triplett | 52/410 |
| 4,715,756 A * | 12/1987 | Danico et al. | 411/369 |
| 4,749,321 A * | 6/1988 | Knohl et al. | 411/371.1 |
| 4,749,322 A * | 6/1988 | Sygnator | 411/387.3 |
| 4,875,818 A * | 10/1989 | Reinwall | 411/369 |
| 4,884,932 A * | 12/1989 | Meyer | 411/373 |
| 5,112,178 A * | 5/1992 | Overhues et al. | 411/544 |
| 5,188,441 A * | 2/1993 | Rubel | 305/180 |
| 5,205,692 A * | 4/1993 | Kelbert et al. | 411/173 |
| 5,407,313 A * | 4/1995 | Bruins et al. | 411/544 |
| 5,547,326 A * | 8/1996 | Overhues | 411/544 |
| 5,658,108 A * | 8/1997 | Swick | 411/368 |
| 5,743,691 A * | 4/1998 | Donovan | 411/180 |
| 5,827,028 A * | 10/1998 | Swick | 411/368 |
| 6,082,942 A * | 7/2000 | Swick | 411/368 |
| 6,233,889 B1 * | 5/2001 | Hulsey | 52/302.1 |
| 6,497,543 B1 * | 12/2002 | Lyons | 411/171 |
| 7,192,232 B2 * | 3/2007 | Esser | 411/161 |
| 7,818,940 B2 * | 10/2010 | Herb | 52/704 |
| 7,857,566 B2 * | 12/2010 | Sullivan et al. | 411/155 |
| 8,029,223 B2 * | 10/2011 | Mair | 411/542 |
| 8,931,160 B2 * | 1/2015 | Shinjo | 411/179 |
| 2004/0131443 A1 * | 7/2004 | Terry | 411/161 |
| 2005/0286988 A1 | 12/2005 | Harris | |
| 2007/0212191 A1 * | 9/2007 | Nilsen et al. | 411/162 |
| 2008/0148544 A1 * | 6/2008 | Shuart et al. | 411/179 |
| 2010/0047037 A1 * | 2/2010 | Ishida et al. | 411/427 |

FOREIGN PATENT DOCUMENTS

| | | |
|---|---|---|
| DE | 92 01 686 U1 | 4/1992 |
| DE | 100 01 857 A1 | 7/2001 |
| DE | 697 07 099 T2 | 3/2002 |
| DE | 10 2004 006 628 A1 | 9/2005 |
| GB | 993 021 A | 5/1965 |
| JP | 06-010936 | 1/1994 |
| JP | 08-042551 | 2/1996 |
| JP | 2001317529 | 11/2001 |
| JP | 3404585 | 3/2003 |
| KR | 10-2006-0041209 | 5/2006 |
| WO | 00/77410 | 12/2000 |
| WO | 2008/066031 A1 | 6/2008 |

OTHER PUBLICATIONS

Search Report of the German Patent and Trademark Office which issued in connection with corresponding German Patent Application No. 20 2008 011 371.7 on Jul. 17, 2009.

International Search Report which issued in connection with International Application No. PCT/DE2009/050046 on Jan. 21, 2010.

* cited by examiner

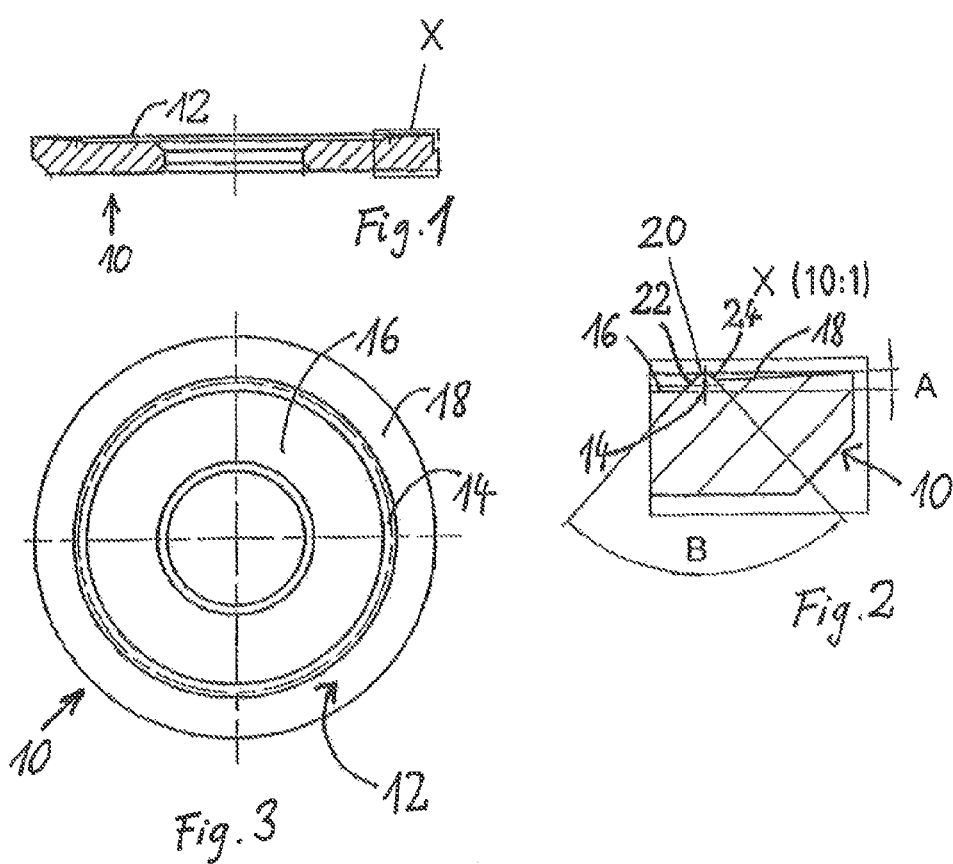

WASHER, SCREW OR NUT WITH INCREASED COEFFICIENT OF FRICTION

RELATED/PRIORITY APPLICATION

This application is a National Phase filing regarding International Application No. PCT/DE 2009/050046, filed on Aug. 24, 2009, which relies upon German Application No. 20 2008 011 371.7, filed on Aug. 26, 2008, for priority.

TECHNICAL FIELD

The present invention relates to a washer, screw or nut having an end face which faces a workpiece and on which it is provided with a profile which increases the coefficient of friction.

PRIOR ART

In the automotive industry, the problem is becoming more and more frequent whereby the constructional space available for connecting members is becoming smaller and the forces to be transmitted are increasing because of higher vehicle performances and higher requirements. In this context some connections, such as strut bars, push rods, lateral shock absorbers, etc., are mainly acted on by transverse forces. To be able to absorb larger transverse forces ($F_T$), a higher clamping force ($F_C$) or a higher coefficient of friction ($\mu_T$) is required, in accordance with the formula $F_C=F_T/\mu_T$.

A higher clamping force can only be achieved by way of a larger screw prestressing force. In turn, this can only be achieved by way of a larger screw size or by screwing in until the yield point of the screw material is reached. If the space for a larger screw is not available, and screwing in until the yield point is reached is not safe, the only remaining option is to increase the coefficient of friction.

In the known prior art, this is attempted in some types of application, such as pulleys etc., by way of additional members, such as diamond discs. However, this solution is expensive and elaborate because of the relatively expensive member and the additional component.

In the prior art, a washer with an end face facing a workpiece for improving the tightness of a screw connection is known from GB 993 021, said washer being provided with a concentric annularly encircling web, wherein the part of the end face outside of the encircling web tapers conically towards the web from the outside, and wherein the inclination from the outside to the inside is directed away from the workpiece.

A similar washer also for improving the tightness is known from DE 92 01 686 U1. In this case, however, a level end face with respect to the workpiece comprising a plurality of concentric annularly encircling webs is provided.

In contrast, WO 2008/066 031 A1 discloses a washer also serving as a seal and having a flat end face with respect to the workpiece which extends inclined at an angle of 60 to 89° from the outside to the inside relative to the axis of rotation of the washer. In this context, flat means without any protrusions or webs.

All prior art documents mentioned above disclose washers which serve for improving the tightness of a screw hole. None of the documents cited describes increasing the forces which can be transmitted, which is the aim of the present invention.

SUMMARY OF THE INVENTION

Based on this prior art, the object of the present invention is to increase the coefficient of friction without requiring an additional member which has to be inserted during assembly.

According to the invention, this object is achieved in that the end face of a washer, screw or nut facing the respective workpiece is provided, in accordance with the invention, with a special profile. In this context, studs or ribs as a profile have not achieved the desired result. To achieve the stated object, the present invention therefore selects for the first time an end face which is provided with a concentric, annularly encircling web as a profile and a region of the end face outside the encircling web which tapers conically towards the web from the outside, the inclination from the outside to the inside being directed away from the workpiece and the inclination of the conically tapering region to the plane of the workpiece being 1.5 to 2.5°.

By comparison with all of the shapes known in the prior art, this special shape according to the invention can absorb by far the highest transverse forces. A further additional advantage of the present invention is that it can provide a one-hundred percent water-tight connection. This is frequently required, since water, in combination with road salt in winter for example, can lead to severe corrosion between the material of the washer, nut or screw (steel) and the material of the workpiece (nowadays usually aluminium) because of the electrochemical series. This is therefore a particular advantage of the present invention when used with pairs of materials having different electrochemical potentials.

The profile according to the invention for the end face of washers, screws or nuts increases the theoretical coefficient of friction resulting from a positive fit so much that extremely high transverse forces can be transmitted. It is virtually possible to achieve a theoretical coefficient of friction of 1. In the prior art, coefficients of friction of 0.1 to 0.3 are usually achieved, depending on the surface. In this context, the absolutely water-tight connection is a further additional advantage of the invention.

Because of its circular symmetry, the profile according to the invention may be applied to or pressed onto the end face of a screw, nut or blind rivet nut directly. In addition, it is also possible according to the invention to apply the profile according to the invention to a washer, and subsequently to use this washer with a normal screw, nut or blind rivet nut or to connect the corresponding washer to the respective connecting member directly by rolling, welding or adhesion.

The concentric, annularly encircling web according to the invention on the end face penetrates into the base material of the workpiece, where it transmits the large transverse forces via a positive fit.

In this context, it is particularly preferred for the region of the end face inside the encircling web to be arranged deeper relative to the workpiece than the outer region and than the theoretical zero point of the contact surface between the end face and the workpiece. In this way, it can be ensured that the web always penetrates first and completely into the base material of the workpiece (usually aluminium or another light metal). This ensures the positive fit, the water-tightness and the high transverse force transmission capacity.

BRIEF DESCRIPTION OF THE DRAWINGS

The present invention is explained in greater detail in the following by way of the embodiment shown in the drawings, in which:

FIG. 1 is a section taken in the radial direction through a washer according to the invention;

FIG. 2 is the detail X from FIG. 1; and

FIG. 3 is a view of the washer from FIG. 1, looking onto the end face on the work-piece side.

PREFERRED EMBODIMENT OF THE INVENTION

FIG. 1 is a sectional view of a washer 10 according to the invention, the section being taken along the axis of rotation. This washer 10 comprises an end face 12 which faces a workpiece when the washer 10 is mounted. As can be seen more clearly in FIGS. 2 and 3, a concentrically encircling web 14 is attached to this end face 12.

As can be seen particularly clearly in FIG. 2, the region 16 of the end face 12 inside the encircling web 14 is arranged deeper relative to the workpiece, preferably by 0.2 to 0.4 mm.

As can also be seen most clearly from the detailed view of FIG. 2, the region 18 of the end face 12 outside the encircling web 14 is inclined at an inclination of 1.5 to 2.5° to the plane of the workpiece, (indicated by angle A in FIG. 2), in such a way that the distance between the workpiece and the surface of the washer 10 increases from the outside towards the web 14.

As can also be seen in the detailed view of FIG. 2, the web 14 has a cross-section in the form of a rounded V, the rounded point 20 of which points towards the workpiece. The flanks 22, 24 of the web 14 approach one another at an angle of 80 to 90° (indicated by angle B in FIG. 2).

The present invention has been explained here by way of a washer. In the same manner as has been described here for a washer, the present invention may of course also be carried out on a corresponding end face of a nut or blind rivet nut or on the underside of the head of a screw, in that the corresponding end faces facing the workpiece in each case are configured accordingly.

The washer according to the invention can either be used loose or be rolled, welded or adhesively bonded onto a corresponding connecting member.

Naturally, the profile according to the invention of the end face can be manufactured particularly cost-effectively if the corresponding profile is applied to the corresponding end face of the nut, blind rivet nut or screw straight away, during manufacture.

The invention claimed is:

1. Washer, screw or nut having an end face directly contacting a workpiece, wherein the end face is provided with a concentric, annularly encircling web, and a region of the end face outside the encircling web tapers conically towards the web from the outside, the inclination from the outside to the inside being directed away from the workpiece, wherein the inclination of the conically tapering region to the plane of the workpiece is 1.5 to 2.5°, wherein the web has a cross-section in the form of a rounded V, the rounded point of which points towards, and is configured to penetrate, the workpiece.

2. Washer, screw or nut according to claim 1, wherein a region of the end face inside the encircling web is arranged deeper relative to the workpiece.

3. Washer, screw or nut according to claim 1, wherein flanks of the web together form an angle of 80 to 90°.

4. Washer, screw or nut according to claim 2, wherein the region of the end face inside the web is arranged 0.2 to 0.4 mm deeper than the web.

* * * * *